United States Patent
Rasanen et al.

(10) Patent No.: US 10,432,518 B2
(45) Date of Patent: Oct. 1, 2019

(54) PACKET FLOW OPTIMIZATION IN A NETWORK

(71) Applicants: NOKIA SOLUTIONS AND NETWORKS OY, Espoo (FI); Juha Antero Rasanen, Espoo (FI); Devaki Chandramouli, Plano, TX (US)

(72) Inventors: Juha Antero Rasanen, Espoo (FI); Devaki Chandramouli, Plano, TX (US)

(73) Assignee: NOKIA SOLUTIONS AND NETWORKS OY, Espoo (FI)

( * ) Notice: Subject to any disclaimer, the term of this patent is extended or adjusted under 35 U.S.C. 154(b) by 16 days.

(21) Appl. No.: 15/120,364

(22) PCT Filed: Feb. 21, 2014

(86) PCT No.: PCT/US2014/017725
§ 371 (c)(1),
(2) Date: Aug. 19, 2016

(87) PCT Pub. No.: WO2015/126415
PCT Pub. Date: Aug. 27, 2015

(65) Prior Publication Data
US 2017/0063678 A1    Mar. 2, 2017

(51) Int. Cl.
*H04L 12/713* (2013.01)
*H04L 12/24* (2006.01)
(Continued)

(52) U.S. Cl.
CPC ........ *H04L 45/586* (2013.01); *H04L 41/5054* (2013.01); *H04L 45/38* (2013.01); *H04L 47/2416* (2013.01); *H04L 47/2441* (2013.01)

(58) Field of Classification Search
CPC ....... H04L 12/24; H04L 12/26; H04L 12/713; H04L 12/721; H04L 12/851;
(Continued)

(56) References Cited

U.S. PATENT DOCUMENTS 7,292,567 B2 * 11/2007 Terrell .................... H04L 45/00
                                                          370/363
7,362,702 B2 *  4/2008 Terrell .................... H04L 45/00
                                                          370/230
(Continued)

FOREIGN PATENT DOCUMENTS

WO    2013/144747 A1    10/2013

OTHER PUBLICATIONS

ETSI GS NFV 001 V1.1.1 (Oct. 2013), Network Functions Virtualisation (NFV); Use Cases; 2013.
(Continued)

*Primary Examiner* — Tri H Phan
(74) *Attorney, Agent, or Firm* — Squire Patton Boggs (US) LLP

(57) ABSTRACT

Various communication systems may benefit from improvements in communication flow. For example, a network may benefit from packet flow optimization. A method can include receiving a flow at an entity of a communication system having a virtualized control plane. The method can also include dynamically deciding how to route the flow to an entity selected from a group of entities comprising at least one virtualized part of an entity. The method can further include routing the flow as decided.

19 Claims, 11 Drawing Sheets

(51) Int. Cl.
*H04L 12/721* (2013.01)
*H04L 12/851* (2013.01)
*H04L 12/853* (2013.01)

(58) Field of Classification Search
CPC ............... H04L 12/853; H04L 41/5054; H04L 41/5041–5058; H04L 45/38; H04L 45/70; H04L 45/586; H04L 47/2416; H04L 47/2441
See application file for complete search history.

(56) References Cited

U.S. PATENT DOCUMENTS

| | | | | |
|---|---|---|---|---|
| 8,238,324 | B2* | 8/2012 | Karaoguz | H04L 45/00 370/351 |
| 8,341,291 | B2* | 12/2012 | Twitchell, Jr. | H04L 45/586 709/238 |
| 8,514,854 | B2* | 8/2013 | Wang | H04L 45/586 370/389 |
| 8,612,612 | B1 | 12/2013 | Dukes et al. | |
| 8,762,501 | B2* | 6/2014 | Kempf | H04L 12/4633 709/220 |
| 8,867,361 | B2* | 10/2014 | Kempf | H04W 24/02 370/216 |
| 8,873,398 | B2* | 10/2014 | Kempf | H04W 24/02 370/216 |
| 9,167,501 | B2* | 10/2015 | Kempf | H04L 12/4633 |
| 9,258,275 | B2* | 2/2016 | Sun | H04L 63/0227 |
| 9,497,661 | B2* | 11/2016 | Kempf | H04W 24/02 |
| 10,098,052 | B2* | 10/2018 | Hu | H04W 40/246 |
| 2012/0300615 | A1* | 11/2012 | Kempf | H04W 24/02 370/216 |
| 2013/0054761 | A1* | 2/2013 | Kempf | H04L 12/4633 709/220 |
| 2013/0060940 | A1* | 3/2013 | Koponen | H04L 12/4633 709/225 |
| 2014/0321278 | A1* | 10/2014 | Cafarelli | H04L 47/2441 370/235 |
| 2014/0328204 | A1* | 11/2014 | Klotsche | H04L 43/028 370/252 |
| 2015/0063166 | A1* | 3/2015 | Sif | G06F 9/45558 370/254 |
| 2016/0173338 | A1* | 6/2016 | Wolting | H04L 41/145 709/223 |
| 2017/0026894 | A1* | 1/2017 | Hu | H04W 40/246 |

OTHER PUBLICATIONS

Arsany Basta et al A Virtual SDN-enabled LTE EPC Architecture: a case study for S-/P-Gateways functions; 2013.
Said Siwar Ben Hadj et al New Control Plane in 3GPP LTE/EPC Architecture for On-Demand Connectivity Service; 2013.
European Search Report application No. 14883052.4 dated Sep. 27, 2017.
International Search Report & Written Opinion dated Jun. 17, 2014 corresponding to International Patent Application No. PCT/US2014/017725.
3GPP TS 29.281 V11.6.0 (Mar. 2013), Technical Specification, 3rd Generation Partnership Project; Technical Specification Group Core Network and Terminals; General Packet Radio System (GPRS) Tunnelling Protocol User Plane (GTPv1-U) (Release 11), Mar. 2013, 27 pages.
Vodafone, "Clarification of Sender role in VNF Instantiation, Scaling, and Termination flows," ETSI NFVMAN(13) 30 001r2; Oct. 16, 2013, NFVMAN#30, pp. 1-8.
ETSI GS NFV 002 V1.1.1 (Oct. 2013), ETSI Group Specification, "Network Functions Virtualisation (NFV); Architectural Framework," Oct. 2013, 21 pages.
ETSI GS NFV 009 V0.1.6 (Sep. 2013), ETSI Group Specification, "Network Function Virtualisation; Use Cases," Sep. 2013, 56 pages.
Huawei Technologies, "VNF on-boarding update," ETSI, NFV-MAN#30; 2013; NFVMAN(13) 30 003r1, 2 pages.
ETSI GS NFV-MAN 001 v0.0.10 (Oct. 2013); Rapporteur, "Network Functions Virtualisation (NFV) Management and Orchestration," NFVMAN(13)000068, Oct. 2013, 75 pages.
ETSI GS NFV-MAN 001 v0.1.0 (Dec. 2013); Rapporteur, Network Functions Virtualization (NFV); Management and Orchestration; Draft—DGS/NFV-MAN001 v0.1.0, NFVMAN(13)000086, Dec. 2013, 91 pages.

* cited by examiner

PACKET FLOW OPTIMIZATION IN A NETWORK

BACKGROUND

Field

Various communication systems may benefit from improvements in communication flow. For example, a network may benefit from packet flow optimization.

Description of the Related Art

Network function virtualization is discussed in, for example, "Network Functions Virtualization (NFV); Architectural framework", a draft ETSI Group Specification GS NFV 002 v1.1.1, "Network Functions Virtualization (NFV); Management and Orchestration", a draft ETSI Group Specification GS NFV-MAN 001 v0.0.11 and "Network Functions Virtualization; Use Cases", a draft ETSI Group Specification GS NFV 009 v0.1.6, each of which is hereby incorporated herein by reference in its respective entirety.

In this environment, the virtualized network entities can be managed by a network function virtualization orchestrator (NFVO). The NFVO can dynamically and automatically distribute and maintain virtualized network functions in the infrastructure. For example, the NFVO can set up virtual machines (VMs) to run on given physical machines (PMs) and can set up virtual network functions/entities to run on the VMs, as well as define, allocate, and scale resources to the virtual entities and machines. The NVFO may also have an interface to legacy O&M functions to utilize existing O&M functionalities.

One example of network function virtualization is virtualization of the 3GPP mobile network environment. One distinct area within the 3GPP environment is the evolved packet core (EPC), which contains both pure control plane entities, such as the mobility management entity (MME), and entities with both a control plane (CP) and user plane (UP), such as the gateway entities, including serving gateway (S-GW), packet data network (PDN) gateway (P-GW), and in certain conditions serving general packet radio system (GPRS) support node (SGSN).

Concerning the gateway entities with both the CP and UP, two different approaches have been considered. FIG. 1 illustrates a first approach, in which an application level control plane is virtualized while a user plane is not virtualized. Thus, in FIG. 1, the application level control plane (CP) is virtualized and consequently resides and runs on a virtual machine (VM). By contrast, the user plane (UP) is not virtualized, and thus resides and runs on a dedicated hardware platform. This can be applied to both an S-GW and a P-GW in a 3GPP EPC environment, as shown. The access network protocol in this example is GPRS tunneling protocol (GTP). The user plane part, GTP-U, is terminated on P-GW user plane.

FIG. 2 illustrates a second approach, in which both the application level control plane and user plane are virtualized. Thus, both the application level CP and UP reside and run on a virtual machine. FIG. 2 describes this approach and principle, as applied to both an S-GW and a P-GW in a 3GPP EPC environment. The access network protocol in this example is GTP, as in FIG. 1. The user plane part, GTP-U, is routed via the virtual machines (VMs) and terminated on P-GW user plane on the virtual machine VM-2.

In the first approach, as illustrated in FIG. 1, the application specific user plane functionalities, such as traffic detection, usage reporting, policy and charging enforcement, event reporting, and the like, are still running on dedicated hardware. This need for the dedicated hardware to run application specific user plane functionalities can effectively reduce the benefits of virtualization. For example, there is no flexibility to adjust hardware and software resources according to the needs created by the traffic situation.

Furthermore, the first approach may require a new CP interface between the virtualized application control plane and the non-virtualized application user plane. This interface may be overloaded with application specific features, and may require control information between CP and UP function.

In the second approach, all user plane traffic goes from the internet protocol (IP) router level, which is typically from dedicated hardware, via the input/output (I/O) circuitry of the VM environment and platform, to the virtualized application user plane on the VM, and back from the VM to the IP router level. In case of high rate or volume traffic flows this is a potential bottle neck in the traffic channel, limiting the number of simultaneous high rate or volume connections and/or the data rates in general. This may also require a highly optimized I/O solution on the VM environment. Delay may be increased by the extra legs of routing the traffic via the application user plane on the VM. Furthermore, since UP function and CP function are always mapped 1 to 1, there is lack of flexibility in choice of UP function and possible bottleneck due to such a mapping.

SUMMARY

According to certain embodiments, a method can include receiving a flow at an entity of a communication system having a virtualized control plane. The method can also include dynamically deciding how to route the flow to an entity selected from a group of entities comprising at least one virtualized part of an entity. The method can further include routing the flow as decided.

A non-transitory computer-readable medium can, in certain embodiments, be encoded with instructions that, when executed in hardware, perform a process. The process can be, for example, the above-described method. Likewise, a computer program product can, according to certain embodiments, encode instructions for performing a process. The process can be the above-described method, for example.

In certain embodiments, an apparatus can include at least one processor and at least one memory including computer program instructions. The at least one memory and the computer program instructions can be configured to, with the at least one processor, cause the apparatus at least to receive a flow at an entity of a communication system having a virtualized control plane. The at least one memory and the computer program instructions can also be configured to, with the at least one processor, cause the apparatus at least to dynamically decide how to route the flow to an entity selected from a group of entities comprising at least one virtualized part of an entity. The at least one memory and the computer program instructions can further be configured to, with the at least one processor, cause the apparatus at least to route the flow as decided.

An apparatus, according to certain embodiments, can include means for receiving a flow at an entity of a communication system having a virtualized control plane. The apparatus can also include means for dynamically deciding how to route the flow to an entity selected from a group of entities comprising at least one virtualized part of an entity. The apparatus can further include means for routing the flow as decided.

BRIEF DESCRIPTION OF THE DRAWINGS

For proper understanding of the invention, reference should be made to the accompanying drawings, wherein.

DETAILED DESCRIPTION

3GPP network virtualization and software defined networking (SDN) can include many aspects. As mentioned above, two fundamentally different ways have been mentioned for packet core virtualization: to virtualize the control part of gateway application or to virtualize both the control and user plane parts. Certain embodiments described herein can resolve some bottleneck and delay issues in the above-described approaches. Certain embodiments, more particularly, are based on dynamic decision making on routing of given flows to be handled by different entities.

Figure 1:
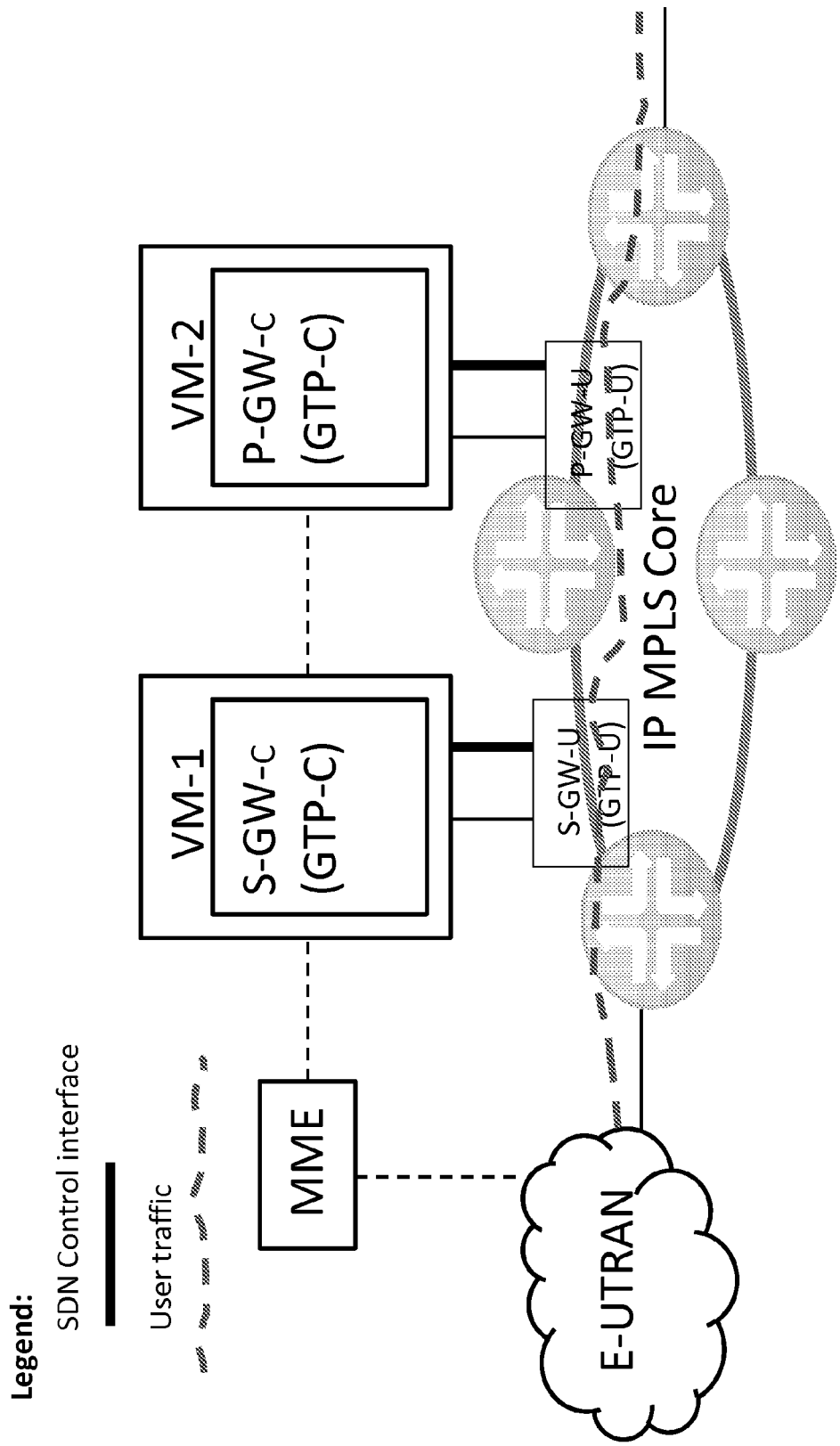
FIG. 1 illustrates an application level control plane virtualized while a user plane is not virtualized.
Figure 2:
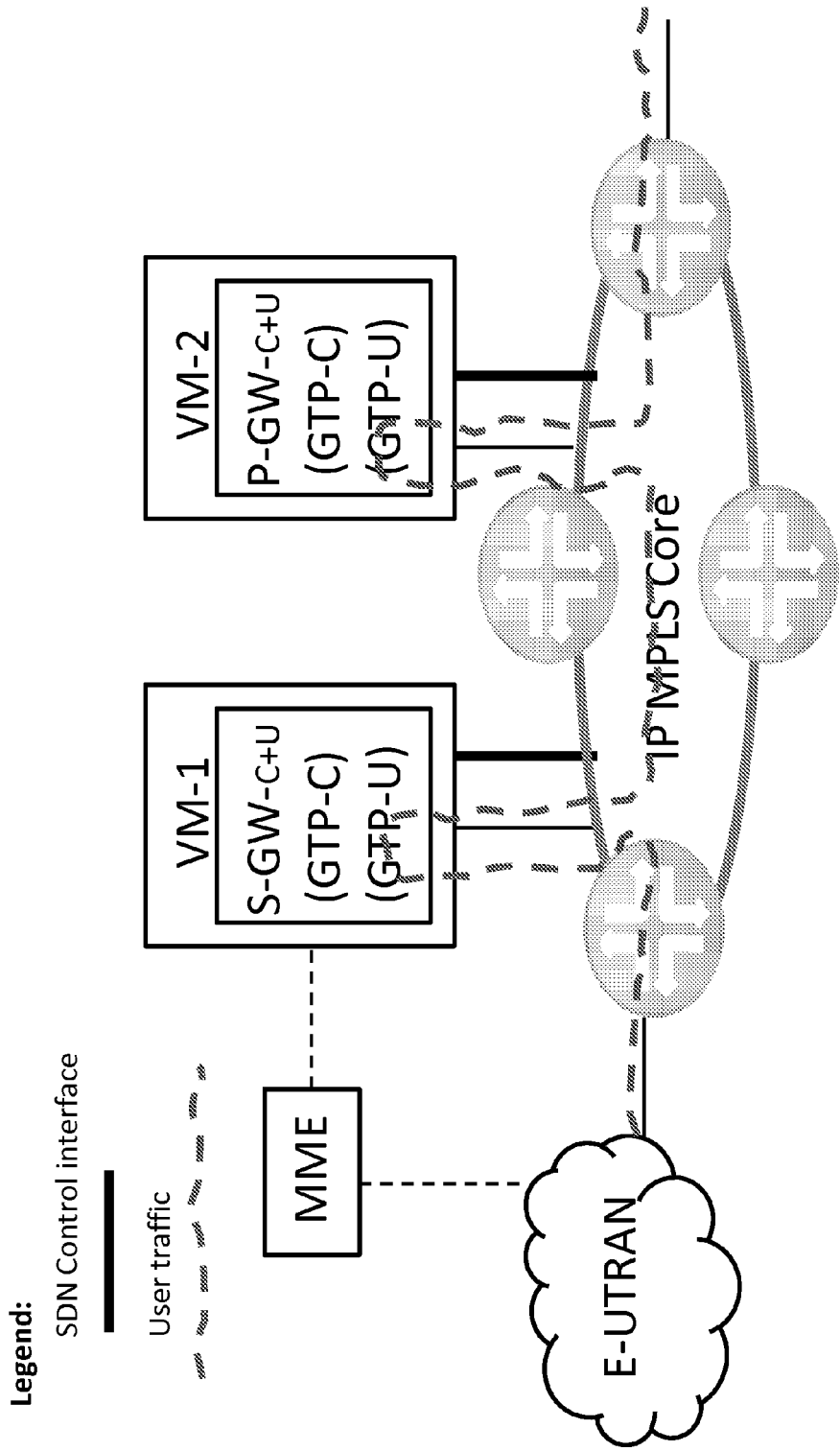
FIG. 2 illustrates both the application level control plane and user plane being virtualized.
Figure 3:
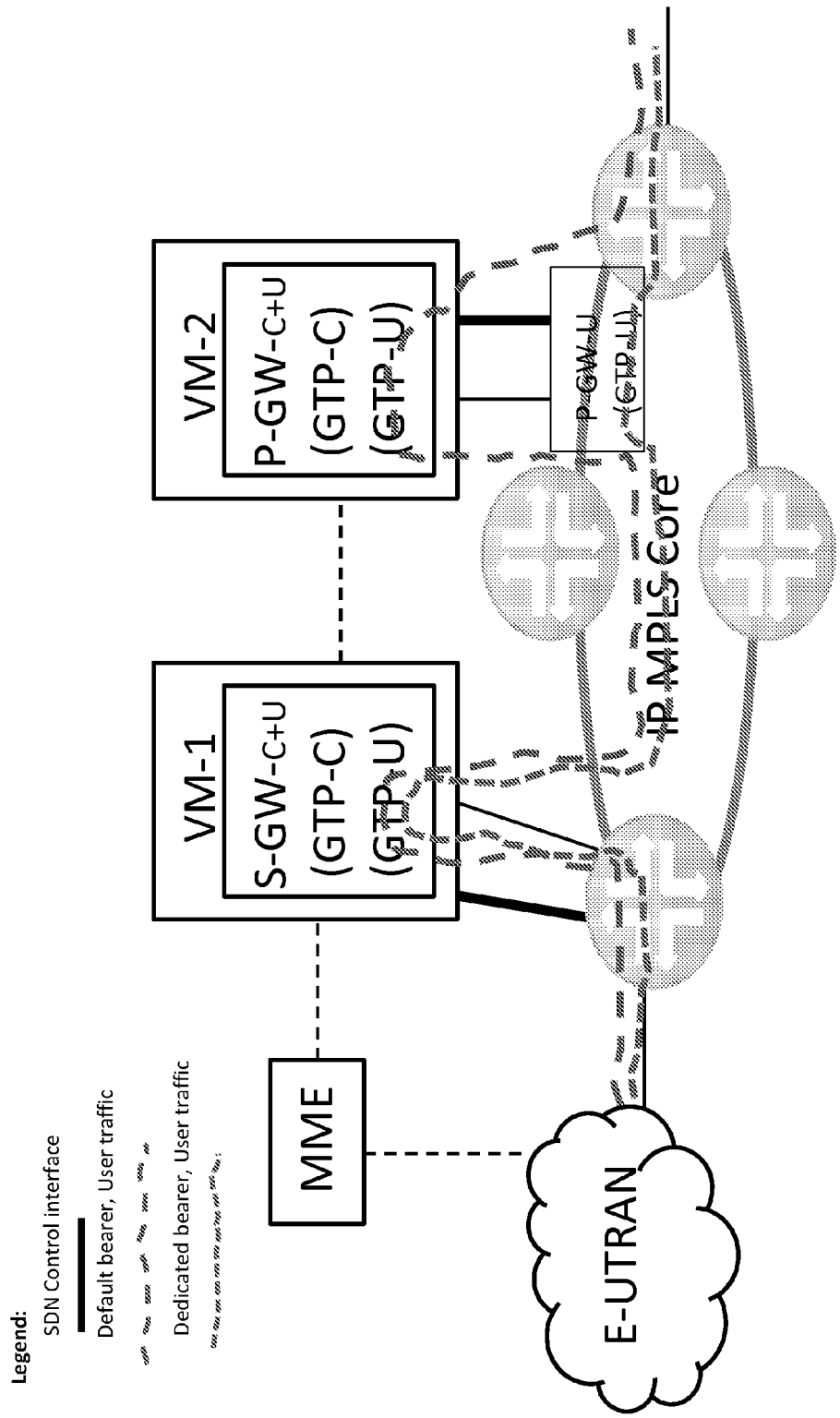
FIG. 3 illustrates both the application level control and user plane virtualized, but the application level user plane is also supported on a dedicated P-GW router hardware platform, according to certain embodiments.

FIG. 3 illustrates both the application level control and user plane virtualized, but the application level user plane is also supported on a dedicated P-GW router hardware platform, according to certain embodiments. Thus, in this case, the access network user plane protocol, for example GTP-U, can be supported by both the virtualized part or entity of the P-GW and the non-virtualized part or entity of the P-GW. The access network UP protocol can be terminated in either one of the entities, if the user plane traffic of the whole IP-CAN session of a user is handled by that entity. FIG. 3 describes this principle by way of an example.

As shown in FIG. 3, for given service data flows (SDFs) carried by the access network UP protocol, the access network UP protocol frames can be terminated on the non-virtualized part or entity of the P-GW. This way the routing of these SDFs can take place on the non-virtualized level of the architecture. Thus, these SDFs do not need to be routed via the virtualized part or entity on the VM even though, for example, the default bearer of the IP-CAN session may terminate on the VM.

Further capabilities that can be supported by both the virtualized part or entity of the P-GW and the non-virtualized part or entity, are any user plane traffic handling actions like, for example, traffic detection, usage reporting, policy and charging enforcement, event reporting, and so on.

A capability indication and/or negotiation mechanism can be provided between the virtualized part of a GW and the non-virtualized part of the GW, in order to allow the virtualized part of the GW to know about the capabilities of the non-virtualized part of the GW and/or vice versa. The indication and/or mechanism can also allow dynamic decisions to be made on which part or entity handles the user plane traffic of the IP-CAN sessions of a given user or the user plane traffic of given service data flows within an IP-CAN session or a given user plane traffic handling action, such as traffic detection. In general, the work split can be based on capability indication and negotiation between P-GW-C on VM and the P-GW-U on dedicated HW.

As an alternative to the indication and/or negotiation mechanism, the supported features can, either partly or fully, be indicated by configuration. For example a network management system may configure the virtualized part of the P-GW to know about the capabilities of the non-virtualized P-GW-U part or entity.

Decisions making can include, for example, whether to terminate the access network user plane protocol, such as GTP-U, of a given IP-CAN session or service data flow, or whether to apply, for example, traffic detection or usage monitoring, on the virtualized part or entity or on the non-virtualized part or entity. Such decision making can be based on the P-GW-C instructing the non-virtualized P-GW-U to apply given actions or features, or on the non-virtualized P-GW-U indicating that it applies given actions or features.

Various conditions may affect the decision making. For example, imminent overload on the non-virtualized part or entity may cause user plane traffic of new sessions to be handled on the VM rather than on the non-virtualized P-GW-U. If the virtualized part or entity, for example the controller, is the decision maker, the non-virtualized part or entity may indicate the imminent overload condition to the virtualized part or entity, for example, the other controller.

Likewise, certain kind of traffic, for example real-time voice and/or video, may be handled on the non-virtualized plane. Furthermore, IP-CAN sessions of certain kind of users, for example machine-type communication (MTC) or prioritized users, may be handled either on the virtualized plane or the non-virtualized plane.

Figure 4:
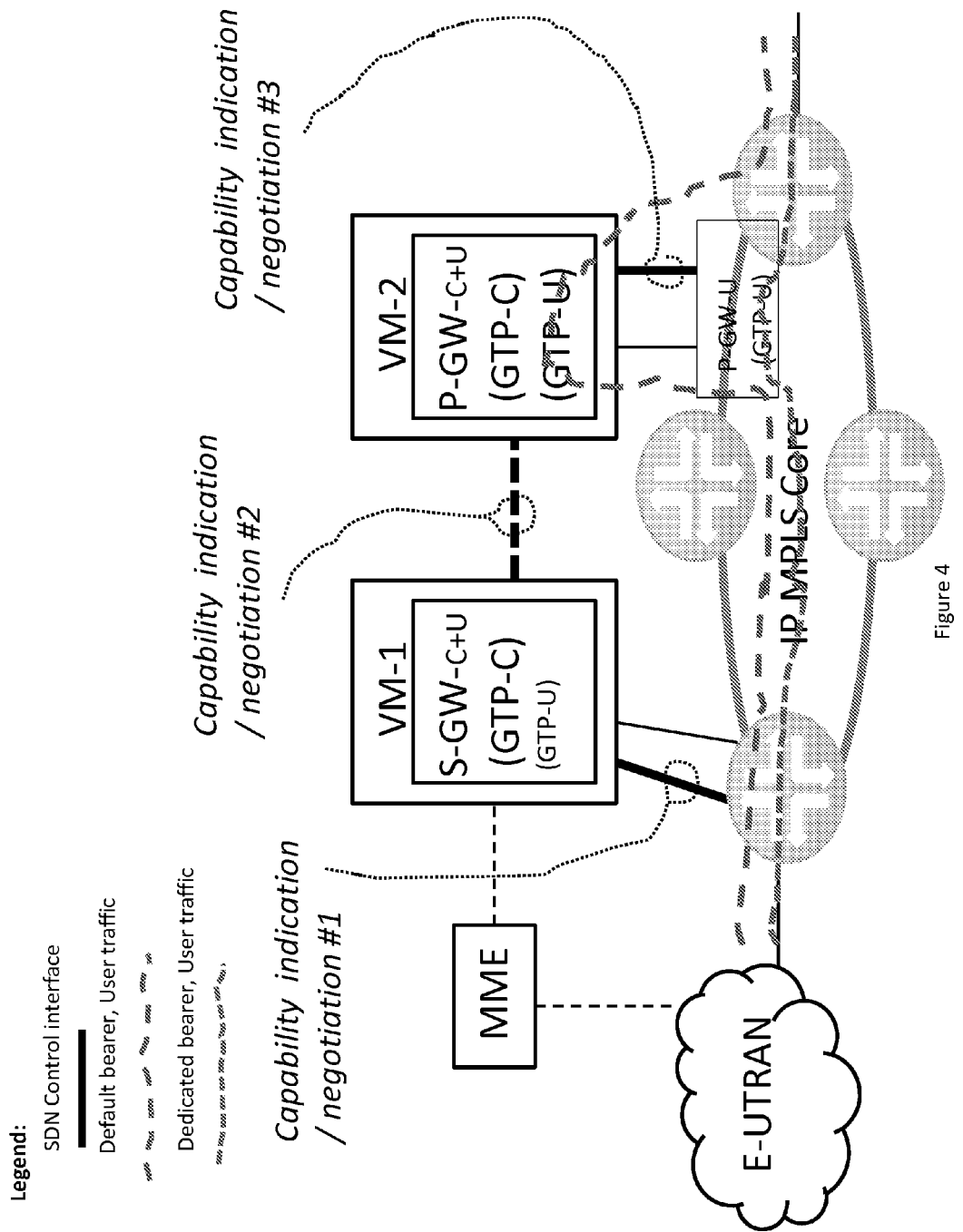
FIG. 4 illustrates both the application level control and user plane virtualized, but the application level user plane is also supported on a dedicated P-GW router hardware platform, and the user plane is tunneled through an S-GW router hardware platform, according to certain embodiments.

FIG. 4 illustrates both the application level control plane and user plane virtualized, but the application level user plane is also supported on a dedicated P-GW router hardware platform, and the user plane is tunneled through an S-GW router hardware platform, according to certain embodiments. A further optimization, with a further indication and/or negotiation mechanism can be provided between the S-GW and P-GW control parts to allow them to agree on tunneling and/or routing the access network UP protocol, such as GTP-U, on the IP router level between the radio access network and P-GW. This can be done, for example, without routing the user traffic via the VM-1. FIG. 4 illustrates this principle by way of an example.

As shown in FIG. 4, the user plane, or given SDFs, can be routed, tunneled, and/or forwarded through the SDN controlled IP router to a P-GW-U or IP router. This functionality may rely on capability indication and/or negotiation, indicated as #1 and #2. More particularly, this functionality may rely on a relevant capability indication (#1 in FIG. 4) from IP router level to S-GW-C. However, if the whole UP is forwarded, it may be using IP based routing rather than TEID based routing, and this capability indication (shown as #1) may not be needed.

Likewise, the functionality may rely on a relevant capability indication (#2 in FIG. 4) from S-GW-C to P-GW-C, for example within an initial GTP-C message exchange. The functionality may also rely on a control or command from P-GW-C to S-GW-C to do the routing, tunneling, and/or forwarding. This control or command may be, for example, for the whole IP-CAN session of the user or for given SDFs, again for example with GTP message exchange.

The P-GW-C can inform the P-GW-U part on the non-virtualized or router level about the use of the access network protocol, which is GTP-U in this example, for routing, tunneling, and/or forwarding to enable the the P-GW-U to apply the required S-GW-U tunnel and bearer management functionalities. More discussion on this topic can be found in 3GPP technical specification (TS) 29.281, which is hereby incorporated herein by reference in its entirety.

As an alternative to the indication and/or negotiation mechanism, the supported features can, either partly or fully, be indicated by configuration. For example, a network management system may configure the virtualized part of S-GW to know about the capabilities of the P-GW to support the routing and/or tunneling and about the capabilities of the non-virtualized S-GW-U part or entity.

Figure 5:
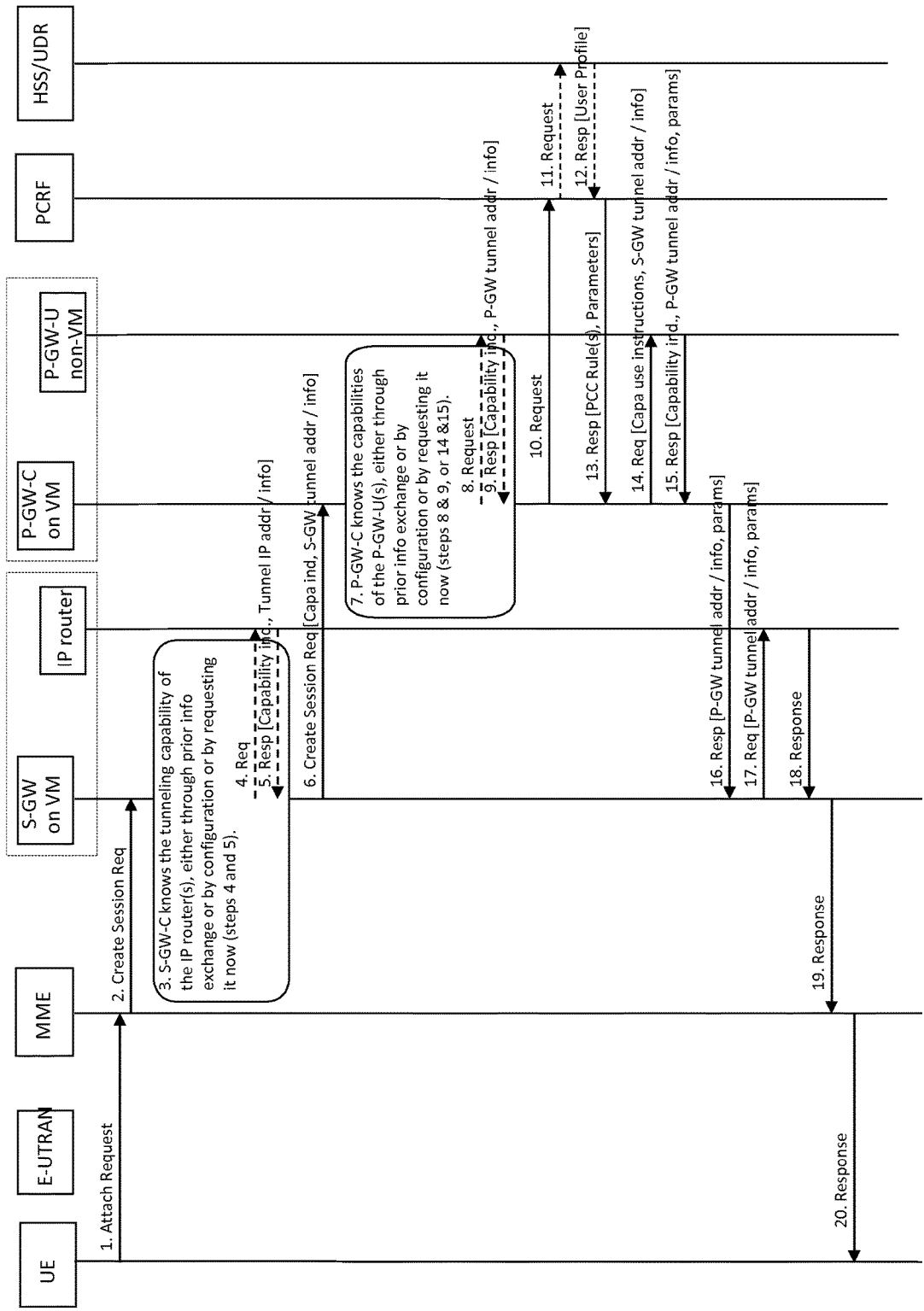
FIG. 5 illustrates a signaling scenario of a method applied to, or in conjunction with, the UE attach procedure, according to certain embodiments.

FIG. 5 illustrates a signaling scenario of a method applied to, or in conjunction with, the UE attach procedure, according to certain embodiments. More particularly, FIG. 5 describes, in the form of a signaling scenario, an embodiment in which a method according to certain embodiments is applied in conjunction with the UE attach procedure in a 3GPP EPC network. This embodiment may allow the whole S-GW to be virtualized and may support the possibility to have a pure and standard IP routing plane below the S-GW application level, including both CP and UP. The routing layer may not have to know about or support, for example, GTP TEIDs or GTP tunnel and bearer management functionalities.

As shown in FIG. 5, at 1 the UE can send an Attach Request message. Then, at 2, the MME can send a Create Session Request message to S-GW. At 3, the S-GW-C knows the tunneling capability of the IP router(s) it controls itself, either through prior information exchange, for example when the control protocol was set up, or by configuration.

Another way for the S-GW-C to know this information is by requesting the information at 4 and 5. Thus, at 4, the S-GW-C may send a request message to the IP router to request capability information, like tunneling capability, and/or tunnel address/information. Then, at 5, the IP router may send capability information and/or tunnel address/information in a response message to S-GW-C.

At 6, the S-GW-C can send a Create Session Request message to P-GW-C. The message may contain capability information, like tunneling capability, and/or tunnel address/information.

At 7, the P-GW-C knows the capabilities of the P-GW-U(s), either through prior information exchange, for example when the control protocol was set up, or by configuration.

Alternatively, the P-GW-C can obtain this knowledge by requesting the information at 8 and 9 or 14 and 15. Thus, for example, at 8 the P-GW-C may send a request message to P-GW-U to request capability information, like tunneling capability, and/or tunnel address/information. At 9, the P-GW-U may send capability information and/or tunnel address/information in a response message to P-GW-C.

At 10, the P-GW-C can send a request message to a policy charging rules function (PCRF), to request authorization and PCC rules for the IP-CAN session. At 11, the PCRF may request the user's subscription profile from the user data repository, such as home subscriber server (HSS), user data repository (UDR) and/or subscriber data and profile repository (SPR).

The user data repository (HSS/UDR/SPR) may, at 12, send the user's subscription profile to PCRF in a response message. Then, at 13, the PCRF may create PCC rules for the IP-CAN session and send them to P-GW-C in a response message.

A 14, the P-GW-C may provide P-GW-U with tunnel information like the S-GW tunnel address, and instruct P-GW-U to apply given capabilities to the user plane traffic of the IP-CAN session. If P-GW-C does not yet know the capabilities of P-GW-U (as at 7, above), the P-GW-C may need and/or get a confirmation of supported capabilities in a response from P-GW-U, at 15. Thus, at 15 the P-GW-U can send a response to P-GW-C. The response may contain tunnel info, for example the P-GW tunnel address, if not already received earlier, for example at 9 above.

At 16, the P-GW-C can send a response to S-GW-C. The response may contain tunnel info, for example the P-GW tunnel address. The following are two possible options. According to a first option, if the P-GW deduces that at least some SDF(s) of the UP of the IP-CAN session of this user may be handled by the P-GW-U on dedicated hardware, the tunnel address/information may be related to the P-GW-U on dedicated hardware. This way the IP router controlled by the S-GW may need to do only pure IP routing without knowing, for example, about GTP specific TEIDs. Thus, the UP protocol, such as GTP-U, can just be transparent payload to the router.

According to a second option, if the P-GW deduces that the whole UP of the IP-CAN session of this user will be handled by the P-GW-U on VM, the tunnel address/information may be related to the P-GW-U on VM. Alternatively, the tunnel address/information may be related to the P-GW-U on dedicated hardware which may then route the UP traffic to the P-GW-U on VM.

The response may contain a separate indication to inform S-GW that the S-GW may tunnel the UP protocol traffic (for example GTP-U) as such without, for example UP protocol specific hop-by-hop actions, so as to route the traffic on IP level to the P-GW.

At 17, the S-GW-C can send a request message to the IP router to enable it to route the user plane protocol traffic (e.g. GTP-U) to P-GW. The request may contain tunnel info, for example the P-GW tunnel address as at 17. Then, at 18, the IP router can send a response message to S-GW.

At 19, the S-GW can send a response message to MME. Then, at 20, the MME can send a response message towards the UE. When an uplink packet arrives in the S-GW, the S-GW can forward the packets to the tunnel address/information which was received at 16 and 17, above.

Figure 6:
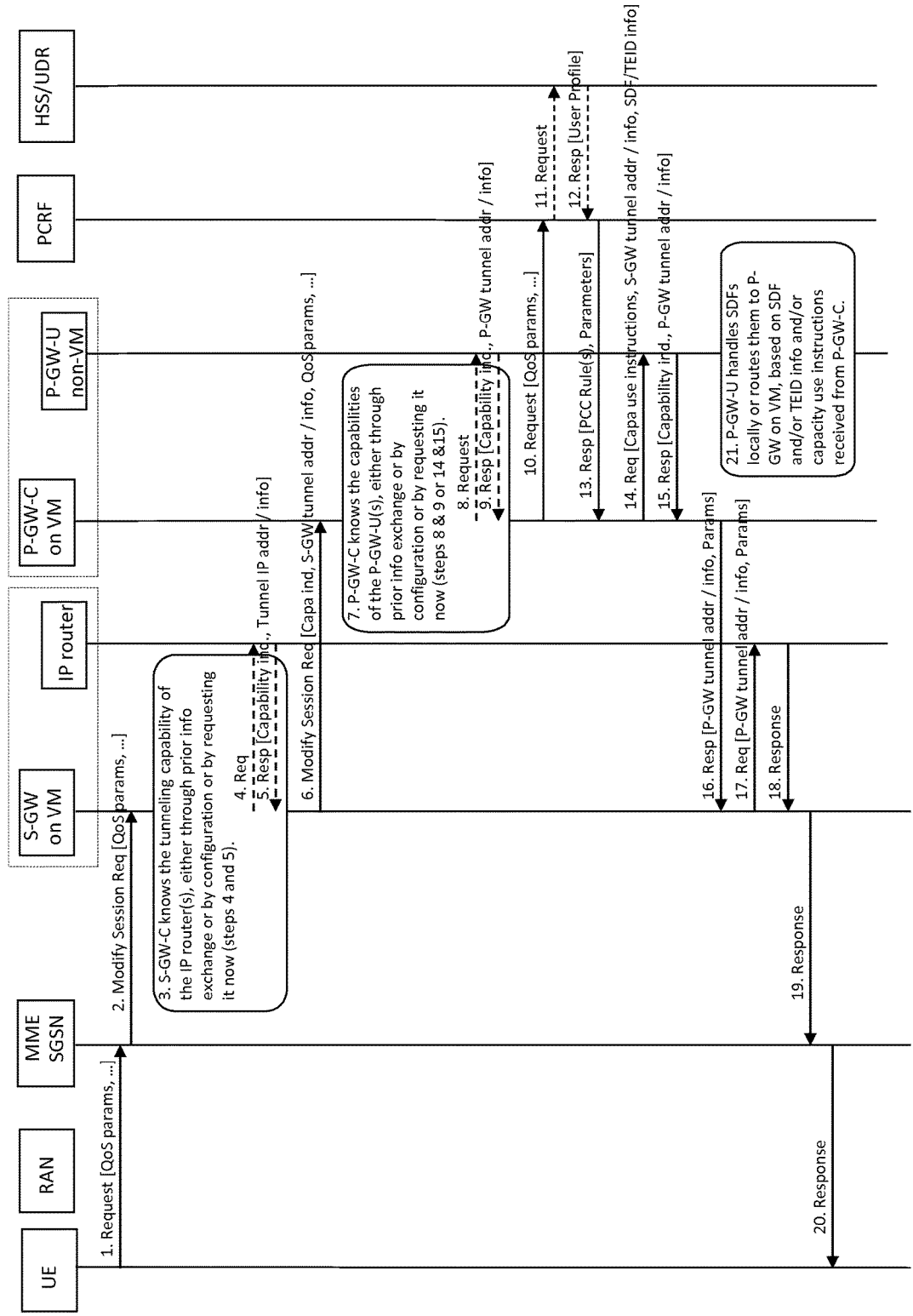
FIG. 6 illustrates a signaling scenario of a method applied to, or in conjunction with, a UE initiated procedure to set up a service data flow, according to certain embodiments.

FIG. 6 illustrates a signaling scenario of a method applied to, or in conjunction with, a UE initiated procedure to set up a service data flow, for example a real-time audio/video flow, and where the P-GW requests the S-GW to route the whole UP traffic to the same P-GW address. Thus, FIG. 6 describes, in the form of a signaling scenario, an embodiment in which a method is applied in conjunction with a UE initiated request to set up a new service data flow (SDF) and where the P-GW requests the S-GW to route the whole UP traffic to the same P-GW address, as per the first embodiment in FIG. 5. This embodiment allows the whole S-GW to be virtualized and supports the possibility to have a pure and standard IP routing plane below the S-GW application level. Thus, the routing layer may not have to know about or support, for example, GTP TEIDs or GTP tunnel and bearer management functionalities.

At 1, the UE can send a Request message with quality of service (QoS) parameters. Then, at 2, the MME/SGSN can send a Modify Session Request message with QoS parameters to the S-GW. At 3, the S-GW-C knows the tunneling capability of the IP router(s) it controls itself, either through prior information exchange, for example when the control protocol was set up, or by configuration. Alternatively, the S-GW-C can know this information by requesting the information at 4 and 5.

Thus, for example, at 4 the S-GW-C may send a request message to the IP router to request capability information, like tunneling capability, and/or tunnel address/information. At 5, the IP router may send capability information and/or tunnel address/information in a response message to S-GW-C.

At 6, the S-GW-C can send a Create Session Request message to P-GW-C. The message may contain tunnel address/information and/or capability information, like tunneling capability, and/or QoS parameters. Then, at 7, the P-GW-C can know the capabilities of the P-GW-U(s), either through prior information exchange, for example when the control protocol was set up, or by configuration.

Alternatively, the P-GW-C can know the capabilities by requesting the information now, for example at 8 and 9 or 14 and 15. At 8, the P-GW-C may send a request message to P-GW-U to request capability information, like tunneling capability, and/or tunnel address/information. The P-GW-U may, at 9, send capability information and/or tunnel address/information in a response message to P-GW-C.

At 10, the P-GW-C can send a request message to PCRF, to request authorization and PCC rules for the IP-CAN session. At 11, the PCRF may request the user's subscription profile from the user data repository, such as HSS/UDR/SPR. At 12, the user data repository (HSS/UDR/SPR) may send the user's subscription profile to PCRF in a response message. Then, at 13, the PCRF may create PCC rules for the IP-CAN session and send them to P-GW-C in a response message.

At 14, the P-GW-C may provide P-GW-U with tunnel information like the S-GW tunnel address, and instruct P-GW-U to apply given capabilities to the user plane traffic of the IP-CAN session. The message may contain SDF information like filters or IP addresses and ports, or tunnel endpoint identifier (TEID) information, for identifying an SDF or SDFs that are to be handled on a non-virtualized part or entity of P-GW-U, i.e. without routing the SDFs to the VM. If P-GW-C does not yet know the capabilities of P-GW-U (as per 7), the P-GW-U may need or get a confirmation of supported capabilities in a response from P-GW-U at 15. Thus, more particularly, at 15 the P-GW-U can send a response to P-GW-C. The response may contain a confirmation of supported and applicable capabilities, and tunnel info, for example the P-GW tunnel address, if not already received earlier, for example at 9.

At 16, the P-GW-C can send a response to S-GW-C. The response may contain tunnel info, for example the P-GW tunnel address. The response may contain a separate indication to inform the S-GW that the S-GW may tunnel the UP protocol traffic (for example GTP-U) as such without, for example UP protocol specific hop-by-hop actions, so as to route the traffic on IP level to the P-GW. At 17, the S-GW-C can send a request message to the IP router to enable it to route the user plane protocol traffic, for example GTP-U, to P-GW. The request may contain tunnel information, for example the P-GW tunnel address and/or information at 16.

At 18, the IP router can send a response message to the S-GW. Then, at 19, the S-GW can send a response message to the MME. At 20, the MME can send a response message towards the UE. The P-GW-U can, at 21, handle SDFs locally or can route them to P-GW on VM, based on SDF and/or TEID info and/or capacity use instructions received from P-GW-C.

Figure 7:
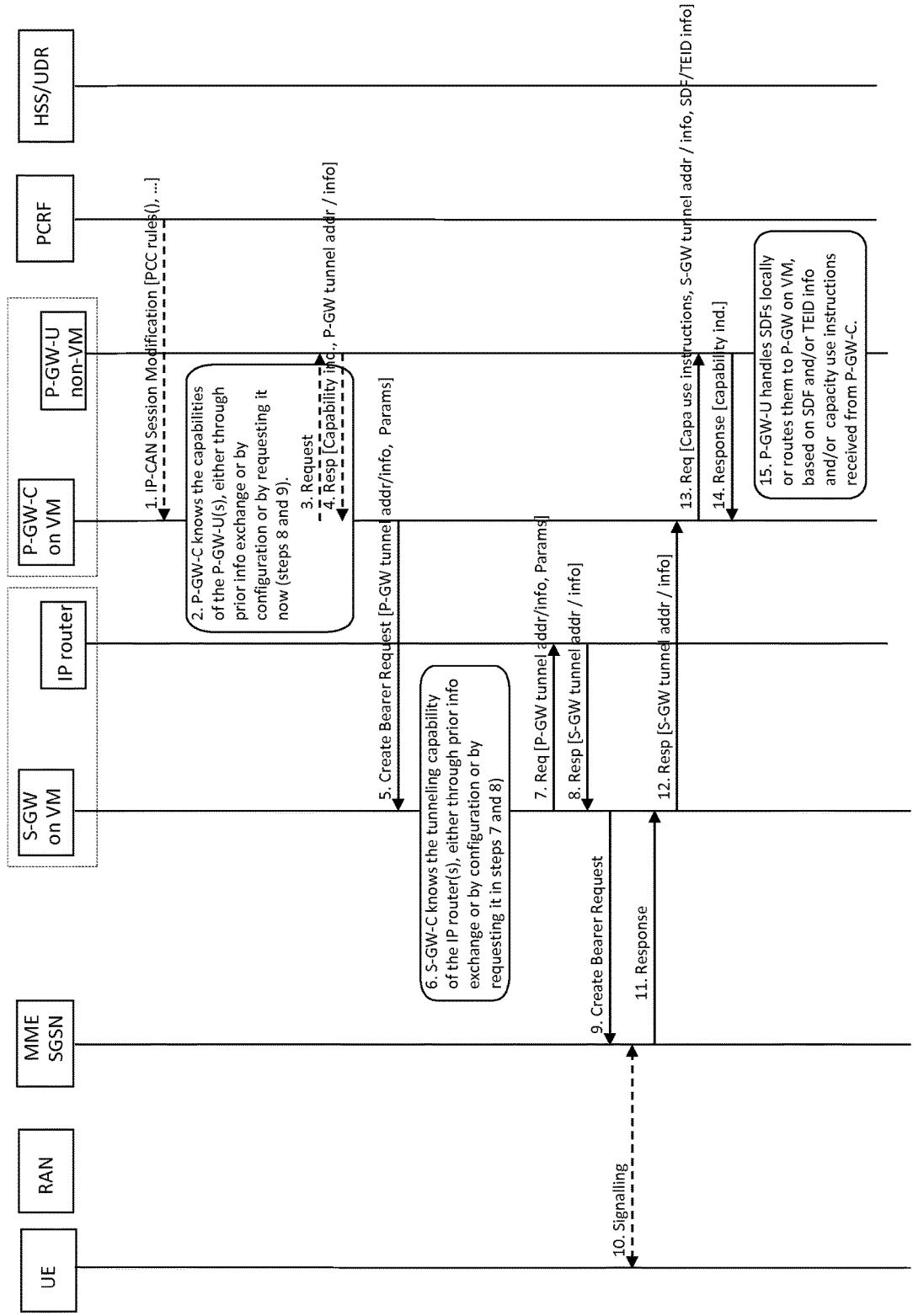
FIG. 7 illustrates a signaling scenario of a method applied to, or in conjunction with, a network initiated procedure to set up a new bearer for a service data flow, according to certain embodiments.

FIG. 7 illustrates a signaling scenario of a method applied to, or in conjunction with, a network initiated procedure to set up a new bearer for a service data flow, such as real-time audio/video flow, and where the P-GW requests the S-GW to route the whole UP traffic to the same P-GW address.

As shown in FIG. 7, a method according to certain embodiments can be applied in conjunction with network initiated bearer setup for a new service data flow and where the P-GW requests the S-GW to route the whole UP traffic to the same P-GW address, as per the first embodiment in FIG. 5. This embodiment may allow the whole S-GW to be virtualized and support the possibility to have a pure and standard IP routing plane below the S-GW application level. The routing layer does not have to know about or support, for example GTP TEIDs or GTP tunnel and bearer management functionalities.

At 1, the P-GW-C can be triggered to set up a new bearer. The triggering event may be, for example, an IP-CAN session modification request message sent by PCRF to P-GW-C as at 1 in FIG. 7, or a P-GW internal trigger like, for example, detection of traffic. At 2, the P-GW-C knows the capabilities of the P-GW-U(s), either through prior information exchange, for example when the control protocol was set up, or by configuration.

Alternatively, the P-GW-C can know this information by requesting the information now, for example at 3 and 4 or 13 and 14. At 3, the P-GW-C may send a request message to P-GW-U to request capability information, like tunneling capability, and/or tunnel address/information. Likewise, at 4 the P-GW-U may send capability information and/or tunnel address/information in a response message to P-GW-C.

At 5, the P-GW-C can send a request message to S-GW-C. The message may contain tunnel information, for example the P-GW tunnel address. The message may contain a separate indication to inform S-GW that the S-GW may tunnel the UP protocol traffic (for example GTP-U) as such without, for example UP protocol specific hop-by-hop actions, so as to route the traffic on IP level to the P-GW. At 6, the S-GW-C can know the tunneling capability of the IP router(s) it controls itself, either through prior information exchange or by configuration.

Alternatively, the S-GW-C can know the information by requesting the information at 7 and 8. At 7, the S-GW-C can send a request message to the IP router to enable it to route the user plane protocol traffic, for example GTP-U, to P-GW.

The request may contain tunnel information, for example the P-GW tunnel address and/or information as mentioned at 5.

At 8, the IP router sends a response message to S-GW. The response message may contain tunnel information, for example the S-GW tunnel address. At 9, the S-GW can send a Create Bearer Request message to MME/SGSN. Then, at 10, the network and UE can signal to establish the new bearer.

At 11, the MME/SGSN can send a response message to S-GW-C. The S-GW-C can, at 12, send a response message to P-GW-C. The response message may contain tunnel information, for example the S-GW tunnel address. Then, at 13, the P-GW-C may provide P-GW-U with tunnel information like the S-GW tunnel address, and instruct P-GW-U to apply given capabilities to the user plane traffic of the IP-CAN session. The message may contain SDF information like filters or IP addresses and ports, or tunnel endpoint identifier information, for identifying an SDF or SDFs that are to be handled on a non-virtualized part or entity of P-GW-U, for example without routing the SDFs to the VM. If P-GW-C does not yet know the capabilities of P-GW-U (as at 2, above), the P-GW-C may need and/or get a confirmation of supported capabilities in a response from P-GW-U, at 14. At 14, the P-GW-U can send a response to the P-GW-C. The response may contain a confirmation of supported and applicable capabilities.

Furthermore, at 15, the P-GW-U can handles SDFs locally or can route them to P-GW on VM, based on SDF and/or TEID info and/or capacity use instructions received from P-GW-C.

Figure 8:
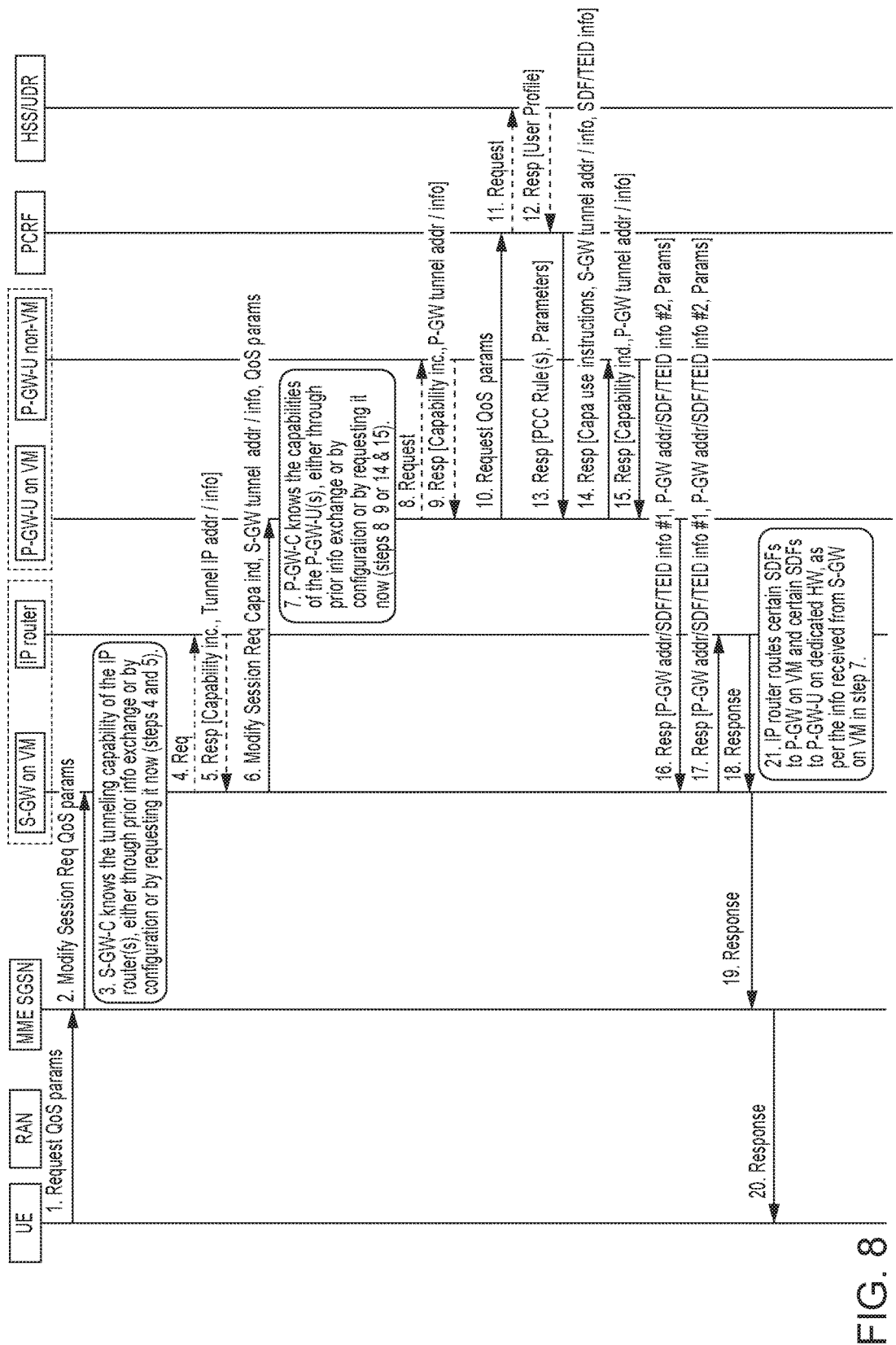
FIG. 8 illustrates a signaling scenario of a method applied to, or in conjunction with, a UE initiated procedure to set up a new bearer for a service data flow, where the P-GW requests different parts of the UP traffic to be routed differently, according to certain embodiments.

FIG. 8 illustrates a signaling scenario of a method applied to, or in conjunction with, a UE initiated procedure to set up a new bearer for a service data flow, such as real-time audio/video flow, and where the P-GW requests the S-GW to route a part of the UP traffic to the address of the P-GW on VM and another part of the UP traffic to the address of the P-GW-U on dedicated hardware. The functionality of this embodiment may imply that the router level controlled by the S-GW can support a mechanism to detect and segregate different SDFs from each other. The detection may be based, for example, on tunnel endpoint identifiers or on SDF filter information, for example five tuple addresses/ports/protocol, received from the P-GW-C.

As shown in FIG. 8, at 1, the UE can send a Request message with QoS parameters. Then, at 2, the MME/SGSN can send a Modify Session Request message with QoS parameters to S-GW. At 3, the S-GW-C knows the tunneling capability of the IP router(s) it controls itself, either through prior information exchange, for example when the control protocol was set up, or by configuration.

Alternatively, the S-GW-C can request the information at 4 and 5. More particularly, at 4 the S-GW-C may send a request message to the IP router to request capability information, like tunneling capability, and/or tunnel address/information. At 5, the IP router may send capability information and/or tunnel address/information in a response message to S-GW-C. Then, at 6, the S-GW-C can send a Create Session Request message to P-GW-C. The message may contain tunnel address/information and/or capability information, like tunneling capability, and/or QoS parameters.

At 7, the P-GW-C knows the capabilities of the P-GW-U(s), either through prior information exchange, for example when the control protocol was set up, or by configuration. Alternatively, the P-GW-C can know the capabilities by requesting the information in steps 8 and 9 or 14 and 15. Thus, for example, at 8 the P-GW-C may send a request message to P-GW-U to request capability information, like tunneling capability, and/or tunnel address/information. Then, at 9, the P-GW-U may send capability information and/or tunnel address/information in a response message to the P-GW-C.

At 10, the P-GW-C can send a request message to PCRF, to request authorization and PCC rules for the IP-CAN session. The PCRF may, at 11, request the user's subscription profile from the user data repository, such as HSS/UDR/SPR. At 12, the user data repository (HSS/UDR/SPR) may send the user's subscription profile to PCRF in a response message. Then, at 13, the PCRF may create PCC rules for the IP-CAN session and send them to P-GW-C in a response message.

At 14, the P-GW-C may provide P-GW-U with tunnel information like the S-GW tunnel address, and instruct P-GW-U to apply given capabilities to the user plane traffic of the IP-CAN session. The message may contain SDF information, like filters or IP addresses and ports, or tunnel endpoint identifier information, for identifying an SDF or SDFs that shall be handled on a non-virtualized part or entity of P-GW-U, namely without routing the SDFs to the VM. If the P-GW-C does not yet know the capabilities of P-GW-U as mentioned at 7, P-GW-C may need and/or get a confirmation of supported capabilities in a response from P-GW-U at 15.

At 15, the P-GW-U can send a response to P-GW-C. The response may contain a confirmation of supported and applicable capabilities, and tunnel info, for example the P-GW tunnel address, if not already received earlier, for example at 9.

At 16, the P-GW-C sends a response to S-GW-C. The response may contain tunnel information, for example an address to P-GW-U on VM and another address to P-GW-U on dedicated hardware, and related SDF and/or TEID information to indicate which SDFs are related to which tunnel address. The message may contain a separate indication to inform S-GW that the S-GW may tunnel the UP protocol traffic (for example GTP-U) as such without, for example, UP protocol specific hop-by-hop actions, so as to route the traffic on IP level to the P-GW.

At 17, the S-GW-C can send a request message to the IP router to enable it to route the user plane protocol traffic, for example GTP-U, to P-GW. The request may contain tunnel information, for example an address to P-GW-U on VM and another address to P-GW-U on dedicated hardware, and related SDF/TEID information and further information, as per 16 above.

At 18, the IP router can send a response message to the S-GW. Then, at 19, the S-GW can send a response message to MME. Next, at 20, the MME can send a response message towards the UE. Finally, at 21, the IP router can route certain SDFs to the P-GW on VM and certain SDFs to the P-GW-U on dedicated HW, as per the information received from S-GW on VM at 7.

Figure 9:
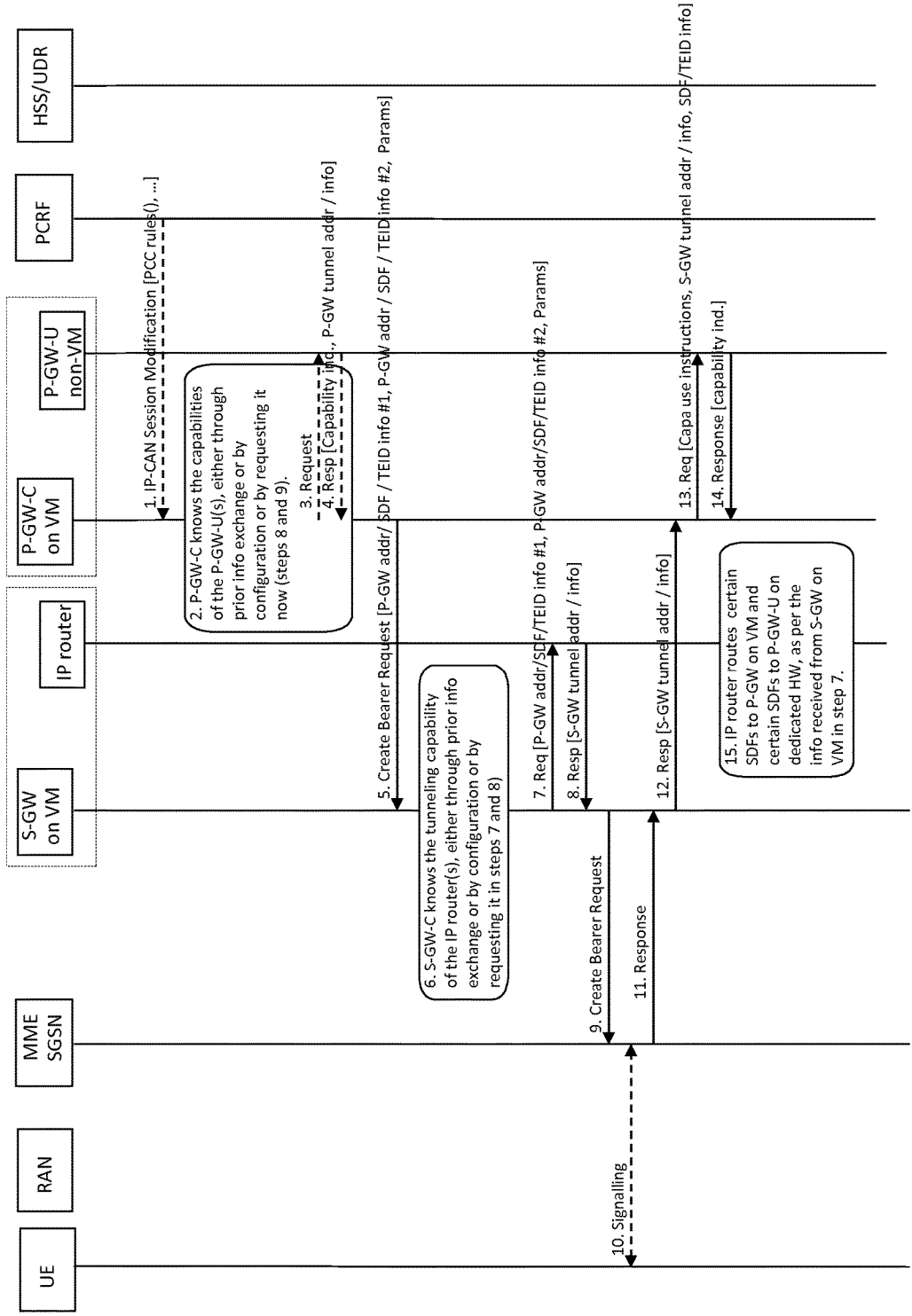
FIG. 9 illustrates a signaling scenario of a method applied to, or in conjunction with, a network initiated procedure to set up a new bearer for a service data flow, where the P-GW requests different parts of the UP traffic to be routed differently, according to certain embodiments.

FIG. 9 illustrates a signaling scenario of a method applied to, or in conjunction with, a network initiated procedure to set up a new bearer for a service data flow, such as real-time audio/video flow, and where the P-GW requests the S-GW to route a part of the UP traffic to the address of the P-GW on VM and another part of the UP traffic to the address of the P-GW-U on dedicated hardware. The functionality of this embodiment may imply that the router level controlled by the S-GW can support a mechanism to detect and segregate different SDFs from each other. The detection may be based, for example, on tunnel endpoint identifiers or on SDF filter information, for example five tuple addresses/ports/protocol, received from the P-GW.

As shown in FIG. 9, at 1 the P-GW-C can be triggered to set up a new bearer. The triggering event may be, for example, an IP-CAN session modification request message sent by the PCRF to the P-GW-C as in step 1 in FIG. 7, or a P-GW internal trigger, for example detection of traffic.

At 2, the P-GW-C can know the capabilities of the P-GW-U(s), either through prior information exchange, for example when the control protocol was set up, or by configuration.

Alternatively, the P-GW-C can know the capability by requesting the information in steps 3 and 4 or 13 and 14. Thus, for example, at 3 the P-GW-C may send a request message to P-GW-U to request capability information, like tunneling capability, and/or tunnel address/information. Then, at 4, the P-GW-U may send capability information and/or tunnel address/information in a response message to P-GW-C.

At 5, the P-GW-C can send a request message to S-GW-C. The message may contain tunnel information, for example an address to P-GW-U on VM and another address to P-GW-U on dedicated hardware, and related SDF and/or TEID information to indicate which SDFs are related to which tunnel address. The message may contain a separate indication to inform S-GW that the S-GW may tunnel the UP protocol traffic (for example, GTP-U) as such without, for example UP protocol specific hop-by-hop actions, so as to route the traffic on IP level to the P-GW-U.

At 6, the S-GW-C can know the tunneling capability of the IP router(s) it controls itself, either through prior information exchange or by configuration. Alternatively, the S-GW-C can request the information at 7 and 8. For example, at 7 the S-GW-C can send a request message to the IP router to enable it to route the user plane protocol traffic (for example GTP-U) to the P-GW-U. The request may contain tunnel information, for example an address to the P-GW on VM and another address to the P-GW-U on dedicated hardware, and related SDF/TEID information and further information, as mentioned at 5. Then, the IP router can send a response message to the S-GW. The response message may contain tunnel information, such as, for example, the S-GW tunnel address.

At 9, the S-GW can send a Create Bearer Request message to the MME/SGSN. At 10, the network and UE can signal to establish the new bearer. Then, at 11, the MME/SGSN can send a response message to the S-GW-C. Likewise, at 12, the S-GW-C can send a response message to the P-GW-C. The response message may contain tunnel information, such as the S-GW tunnel address.

At 13, the P-GW-C may provide the P-GW-U with tunnel information like the S-GW tunnel address, and instruct the P-GW-U to apply given capabilities to the user plane traffic of the IP-CAN session. The message may contain SDF information, like filters or IP addresses and ports, or tunnel endpoint identifier information, for identifying an SDF or SDFs that shall be handled on a non-virtualized part or entity of the P-GW-U, for example, without routing the SDFs to the VM. If P-GW-C does not yet know the capabilities of P-GW-U as mentioned at 2, P-GW-C may need and/or get a confirmation of supported capabilities in a response from P-GW-U at 14.

Namely, at 14, the P-GW-U can send a response to the P-GW-C. The response may contain a confirmation of supported and applicable capabilities. Then, at 15, the IP router can route certain SDFs to the P-GW on VM and certain SDFs to the P-GW-U on dedicated HW, as per the information received from S-GW on VM at 7.

Packet routing in the embodiments illustrated in FIGS. 8 and 9 can be performed in various ways, of which the following are examples. For example, on the uplink the S-GW can receive the SDF and/or TEID information from the P-GW-C. When an UL packet arrives, the S-GW can forward the packet to an entity corresponding to the SDF/TEID information, which can be either a user plane function in the VM or in the non-VM. Then the corresponding entity can forward the packet to the external source.

Likewise, on the downlink for example, the P-GW-U can receive the DL packet from an external source. When the DL packet arrives, the P-GW-U can know whether it can be routed directly to the S-GW or whether it is to be routed via a user plane function in the VM.

Figure 10:
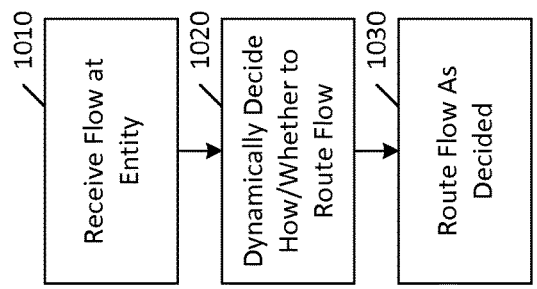
FIG. 10 illustrates a method according to certain embodiments.

FIG. 10 illustrates a method according to certain embodiments. As shown in FIG. 10, a method can include, at 1010, receiving a flow at an entity of a communication system having a virtualized control plane. The entity itself can be a control plane entity, a user plane entity, or can have both functions. Optionally, the communication system can also have a virtualized user plane.

The method can also include, at 1020, dynamically deciding how to route the flow to an entity selected from a group of entities comprising at least one virtualized part of an entity. In one example, the dynamically deciding can include deciding to terminate a service data flow carried by an access network user plane protocol on a non-virtualized part of a packet gateway.

The dynamically deciding can be based on capability information regarding respective capabilities of the virtualized part of the entity and a non-virtualized part of the entity. The dynamically deciding can include deciding whether to apply traffic detection or usage monitoring. Other actions with respect to the flow can also be dynamically decided.

The dynamically deciding can be based on capability information communicated between a control plane part entity and a user plane part entity. For example, the control plane part entity can be a packet gateway control plane entity and the user plane part entity can be a packet gateway user plane entity. Alternatively, or in addition, the dynamically deciding can be based on capability information communicated between a serving gateway entity and packet data network gateway entity.

The dynamically deciding can be based on a current load of a non-virtualized part entity. Thus, for example, when the load of a non-virtualized part entity gets too high, a system implementing the method can favor deciding to offload the flow.

The dynamically deciding can be based on a type of traffic of the flow. For example, the type can be real-time voice or video. Likewise, the dynamically deciding can be based on a type of a user corresponding to the flow. For example, the type of user can be a machine type communication device or a prioritized user.

The method can further include, at 1030, routing the flow as decided.

Figure 11:
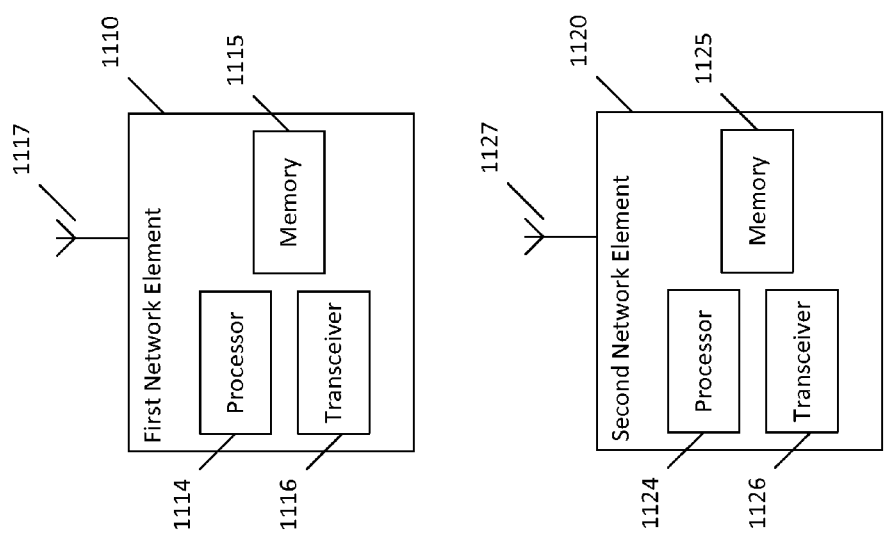
FIG. 11 illustrates a system according to certain embodiments.

FIG. 11 illustrates a system according to certain embodiments. It should be understood that each block of the flowchart of FIG. 10 may be implemented by various means or their combinations, such as hardware, software, firmware, one or more processors and/or circuitry. In one embodiment, a system may include several devices, such as, for example, first network element 1110 and second network element 1120. The system may include more than one second network element 1120 and more than one first network element 1110, although only one of each is shown for the purposes of illustration. A network element can be an access point, a base station, an eNode B (eNB), server, host, a packet data network gateway, a serving gateway, or any of the other network elements, or parts thereof, discussed herein.

Each of these devices may include at least one processor or control unit or module, respectively indicated as 1114 and 1124. At least one memory may be provided in each device, and indicated as 1115 and 1125, respectively. The memory may include computer program instructions or computer code contained therein. One or more transceiver 1116 and 1126 may be provided, and each device may also include an antenna, respectively illustrated as 1117 and 1127. Although only one antenna each is shown, many antennas and multiple antenna elements may be provided to each of the devices. Other configurations of these devices, for example, may be provided. For example, first network element 1110 and second network element 1120 may be additionally configured for wired communication, in addition to wireless communication, and in such a case antennas 1117 and 1127 may illustrate any form of communication hardware, without being limited to merely an antenna. Likewise, some network elements 1110 may be solely configured for wired communication, and in such cases antenna 1117 may illustrate any form of wired communication hardware, such as a network interface card.

Transceivers 1116 and 1126 may each, independently, be a transmitter, a receiver, or both a transmitter and a receiver, or a unit or device that may be configured both for transmission and reception. The transmitter and/or receiver (as far as radio parts are concerned) may also be implemented as a remote radio head which is not located in the device itself, but in a mast, for example. The operations and functionalities may be performed in different entities, such as nodes, hosts or servers, in a flexible manner. In other words, division of labor may vary case by case. One or more functionalities may be implemented as virtual application(s) in software that can run on a server.

In an exemplary embodiment, an apparatus, such as a base station or central node, may include means for carrying out embodiments described above in relation to FIGS. 3 through 10.

Processors 1114 and 1124 may be embodied by any computational or data processing device, such as a central processing unit (CPU), digital signal processor (DSP), application specific integrated circuit (ASIC), programmable logic devices (PLDs), field programmable gate arrays (FPGAs), digitally enhanced circuits, or comparable device or a combination thereof. The processors may be implemented as a single controller, or a plurality of controllers or processors.

For firmware or software, the implementation may include modules or unit of at least one chip set (for example, procedures, functions, and so on). Memories 1115 and 1125 may independently be any suitable storage device, such as a non-transitory computer-readable medium. A hard disk drive (HDD), random access memory (RAM), flash memory, or other suitable memory may be used. The memories may be combined on a single integrated circuit as the processor, or may be separate therefrom. Furthermore, the computer program instructions may be stored in the memory and which may be processed by the processors can be any suitable form of computer program code, for example, a compiled or interpreted computer program written in any suitable programming language. The memory or data storage entity is typically internal but may also be external or a combination thereof, such as in the case when additional memory capacity is obtained from a service provider. The memory may be fixed or removable.

The memory and the computer program instructions may be configured, with the processor for the particular device, to cause a hardware apparatus such as first network element 1110 and/or second network element 1120, to perform any of the processes described above (see, for example, FIGS. 3 through 10). Therefore, in certain embodiments, a non-transitory computer-readable medium may be encoded with computer instructions or one or more computer program (such as added or updated software routine, applet or macro) that, when executed in hardware, may perform a process such as one of the processes described herein. Computer programs may be coded by a programming language, which may be a high-level programming language, such as objective-C, C, C++, C#, Java, etc., or a low-level programming language, such as a machine language, or assembler. Alternatively, certain embodiments of the invention may be performed entirely in hardware.

Furthermore, although FIG. 11 illustrates a system including a first network element 1110 and a second network element 1120, embodiments of the invention may be applicable to other configurations, and configurations involving additional elements, as illustrated and discussed herein. For example, multiple user equipment devices and multiple network elements may be present, or other nodes providing similar functionality, such as nodes that combine the functionality of a user equipment and an access point, such as a relay node. The second network element 1120 may likewise be provided with a variety of configurations for communication other than communication first network element 1110. For example, the second network element 1120 may be configured for device-to-device communication.

Certain embodiments may have various benefits or advantages. For examples, certain embodiments may provide for separation of control and user planes with a control protocol between those entities. Certain embodiments add capability indication/negotiation/control parameters to such a control protocol and to existing access network control protocols, such as GTP-C. A container mechanism of the chosen control protocol can be used, but other ways to implement the required parameters/parameter exchange are also permitted.

Certain embodiments support IP flow handling activities/features to be implemented and/or dynamically used either on VM or on dedicated hardware. The activities and features can include, for example, traffic detection, usage reporting, policy and charging enforcement, event reporting, and the like.

Moreover, certain embodiments can avoid I/O capacity problems on the VM platform by dynamically allowing optimized routing of high rate/volume flows, or flows of higher importance/priority, or flows that do not need handling supported on the application control plane, on the UP. Furthermore, certain embodiments can minimize the delay of real-time flows by allowing optimized routing of such flows on the UP, i.e. without routing the flows via the VM environment.

Certain embodiments, therefore, can be applied to 3GPP evolved packet core network functions virtualization. In more detail, certain embodiments can provide routing of, for example, real-time flows on the IP level to minimize delay. Furthermore, certain embodiments can provide routing of whatever flows on the IP level to avoid/overcome I/O inefficiency problems in the VM/virtualization environment. Additionally, certain embodiments can automatically adapt different CP vs. UP work split solutions implemented by different vendors. Furthermore, certain embodiments can allow operators to group the UE(s) that take a certain path, and dimension the network accordingly. Decision could be based on the type of devices or the type of applications or the type of quality of service requested by the UE. Some devices can take one path, while other devices can take the other path, for example machine-to-machine (M2M) devices as opposed to human-to-human (H2H) devices.

One having ordinary skill in the art will readily understand that the invention as discussed above may be practiced with steps in a different order, and/or with hardware elements in configurations which are different than those which are disclosed. Therefore, although the invention has been described based upon these preferred embodiments, it would be apparent to those of skill in the art that certain modifications, variations, and alternative constructions would be apparent, while remaining within the spirit and scope of the invention. In order to determine the metes and bounds of the invention, therefore, reference should be made to the appended claims.

PARTIAL GLOSSARY

3GPP 3rd generation partnership project
CP Control plane
EPC Evolved packet core
ETSI European Telecommunications Standards Institute
GTP Gateway tunnelling protocol
GTP-C GTP control plane
GTP-U GTP user plane
GW Gateway
HSS Home subscriber server
ID Identity, Identifier
I/O Input/output
IP Internet protocol
IP-CAN IP connectivity access network
ISG Industry specification group
LTE Long term evolution
MME Mobile management entity
MTC Machine type communication
NFVO Network functions virtualization orchestrator
PE Physical environment
P-GW Packet data network gateway
P-GW-C P-GW control plane
P-GW-U P-GW user plane
PM Physical machine
SDF Service data flow
SDN Software defined networking
SGSN Serving general packet radio service support node
S-GW Serving gateway
S-GW-C S-GW control plane
S-GW-U S-GW user plane
SPR Subscription profile repository
TEID Tunnel endpoint identifier
TR Technical report
TS Technical specification
UDR User data repository
UE User equipment
UP User plane
VM Virtual machine
VNF Virtualized network function

We claim:
1. A method, comprising:
receiving, by a gateway entity of a communication system having a virtualized control plane, a flow;
dynamically deciding, by the gateway entity, how to route the flow to a user plane entity selected from a group of user plane entities comprising at least one virtualized part of the gateway entity, wherein depending on the decision the flow is routed via at least one of the virtualized part of the gateway entity and a non-virtualized part of the gateway entity; and
routing, by the gateway entity, the flow as decided.
2. The method of claim 1, wherein the communication system also has a virtualized user plane.
3. The method of claim 1, wherein the dynamically deciding comprises deciding to terminate a service data flow carried by an access network user plane protocol on a non-virtualized part of a packet gateway.
4. The method of claim 1, wherein the dynamically deciding is based on at least one of capability information regarding respective capabilities of the virtualized part of the entity and a non-virtualized part of the entity, and capability information communicated between a control plane part entity and a user plane part entity.
5. The method of claim 1, wherein the dynamically deciding further comprises deciding whether to apply traffic detection or usage monitoring.
6. The method of claim 1, wherein the dynamically deciding is based on at least one of a current load of a non-virtualized part entity, a type of traffic of the flow, and a type of a user corresponding to the flow.
7. The method of claim 6, wherein the type comprises at least one of a real-time voice or video.
8. The method of claim 6, wherein the type of the user comprises at least one of a machine type communication device or a prioritized user.
9. The method of claim 1, wherein the dynamically deciding is based on capability information communicated between a serving gateway entity and packet data network gateway entity.
10. A gateway entity apparatus, comprising:
at least one processor; and
at least one memory including computer program instructions,
wherein the at least one memory and the computer program instructions are configured to, with the at least one processor, cause the apparatus at least to
receive a flow at the gateway entity apparatus of a communication system having a virtualized control plane;
dynamically decide how to route the flow to a user plane entity selected from a group of user plane entities comprising at least one virtualized part of the gateway entity apparatus, wherein depending on the decision the flow is routed via at least one of the virtualized part of the gateway entity apparatus and a non-virtualized part of the gateway entity apparatus; and
route the flow as decided.
11. The apparatus of claim 10, wherein the communication system also has a virtualized user plane.
12. The apparatus of claim 10, wherein the at least one memory and the computer program instructions are configured to, with the at least one processor, cause the apparatus at least to dynamically decide to terminate a service data flow carried by an access network user plane protocol on a non-virtualized part of a packet gateway.
13. The apparatus of claim 10, wherein the at least one memory and the computer program instructions are configured to, with the at least one processor, cause the apparatus at least to dynamically decide based on at least one of capability information regarding respective capabilities of the virtualized part of the entity and a non-virtualized part of the entity, and capability information communicated between a control plane part entity and a user plane part entity.

14. The apparatus of claim 10, wherein the at least one memory and the computer program instructions are configured to, with the at least one processor, cause the apparatus at least to decide whether to apply traffic detection or usage monitoring.

15. The apparatus of claim 10, wherein the at least one memory and the computer program instructions are configured to, with the at least one processor, cause the apparatus at least to dynamically decide based on at least one of a current load of a non-virtualized part entity, a type of traffic of the flow, and a type of a user corresponding to the flow.

16. The apparatus of claim 15, wherein the type comprises at least one of a real-time voice or video.

17. The apparatus of claim 15, wherein the type of the user comprises at least one of a machine type communication device or a prioritized user.

18. The apparatus of claim 10, wherein the at least one memory and the computer program instructions are configured to, with the at least one processor, cause the apparatus at least to dynamically decide based on capability information communicated between a serving gateway entity and packet data network gateway entity.

19. A non-transitory computer-readable medium encoded with instructions that, when executed in a hardware device, perform a process using the device, the process comprising:
   receiving a flow at a gateway entity of a communication system having a virtualized control plane;
   dynamically deciding how to route the flow to a user plane entity selected from a group of use plane entities comprising at least one virtualized part of the gateway entity, wherein depending on the decision the flow is routed via at least one of the virtualized part of the gateway entity and a non-virtualized part of the gateway entity; and
   routing the flow as decided.

* * * * *